United States Patent [19]

Engler et al.

[11] Patent Number: 5,189,262

[45] Date of Patent: Feb. 23, 1993

[54] ADVANCED MOTOR DRIVEN CLAMPED BOREHOLE SEISMIC RECEIVER

[75] Inventors: Bruce P. Engler, Sandoval County; Gerard E. Sleefe; Richard P. Striker, both of Bernalillo County, all of N. Mex.

[73] Assignee: The United States of America as represented by the United States Department of Energy, Washington, D.C.

[21] Appl. No.: 775,871

[22] Filed: Oct. 15, 1991

[51] Int. Cl.⁵ ............................................... G01V 1/40
[52] U.S. Cl. ..................................... 181/102; 181/401; 367/911; 166/206
[58] Field of Search ................. 166/206, 212; 175/230; 181/102-106, 401; 367/25, 911, 912; 73/151

[56] References Cited

U.S. PATENT DOCUMENTS

| | | | |
|---|---|---|---|
| 2,927,459 | 3/1960 | Farrington | 181/102 |
| 3,777,814 | 12/1973 | Gustavson et al. | 367/911 |
| 4,569,412 | 2/1986 | Bouyoucos et al. | 181/119 |
| 4,702,343 | 10/1987 | Paulsson | 181/106 |
| 4,805,727 | 2/1989 | Hardee et al. | 181/106 |
| 5,031,719 | 7/1991 | Baria et al. | 181/122 |

*Primary Examiner*—Brian S. Steinberger
*Attorney, Agent, or Firm*—George H. Libman

[57] ABSTRACT

A borehole seismic tool including a borehole clamp which only moves perpendicular to the borehole. The clamp is driven by an electric motor, via a right angle drive. When used as a seismic receiver, the tool has a three part housing, two of which are hermetically sealed. Accelerometers or geophones are mounted in one hermetically sealed part, the electric meter in the other hermetically sealed part, and the clamp and right angle drive in the third part. Preferably the tool includes cable connectors at both ends. Optionally a shear plate can be added to the clamp to extend the range of the tool.

14 Claims, 5 Drawing Sheets

FIG—1

ADVANCED MOTOR DRIVEN CLAMPED BOREHOLE SEISMIC RECEIVER

The U.S. Government has rights in this invention pursuant to Contract DE-AC04-76DP00789 between the Department of Energy and American Telephone and Telegraph Company.

BACKGROUND OF THE INVENTION

The use of seismic waves to detect the presence of underground oil and gas reservoirs has been practiced for more than half a century. Seismic waves are also used in mining applications, tunnel detection, imaging of local hydrogeological features, and building construction. Basically, seismic exploration techniques involve generating seismic waves with one or more seismic sources, coupling those waves into the earth, and measuring the perturbed seismic waves at pre-selected locations from the source(s) with one or more seismic receivers. Analysis of the information from the measurement of the perturbed seismic waves allows for the determination of the location of, for instance, oil and gas reservoirs.

The current seismic exploration methods consist of four general configurations. The first technique, referred to as Surface Seismic Exploration, uses a configuration where the source(s) and receiver(s) are all on the surface of the earth. The second approach, referred to as Vertical Seismic Profiling (VSP), uses a configuration where the source(s) are on the surface, but the receiver(s) are beneath the surface in one or more boreholes. Borehole depths can be anywhere from a few hundred feet to over 10,000 ft. The third approach, referred to as Reverse VSP, places the source(s) in the borehole(s) but has the receiver(s) on the surface. The fourth configuration, referred to as Cross Borehole, places both source(s) and receiver(s) in different boreholes.

Clamped single station borehole seismic receivers are available from a variety of companies including: E G & G, Sunnyvale, Calif.; Western Atlas; Shlumberger, Paris, France; Teledyne Geotech; and Halliburton, Houston, Tex. These receivers are long (typically 3 ft. in length) and heavy (typically on the order of 150 lbs), and include a variety of mechanisms for clamping the receiver to the borehole including, hydraulic devices, spring-loaded devices, magnetic devices, and motor-driven mechanisms. All of these single-station instruments were originally designed for VSP applications and, as such, were designed primarily to respond to frequencies below 150 Hz. Additionally, because these receivers are large and heavy, they do not readily accommodate stringing of multiple receivers in a single borehole. A further limitation of some is that they are not capable of high temperature operation.

Some prior art receivers utilize hydraulically-driven clamp arm mechanisms, in which the arms extend either perpendicular to the receiver housing or extend outward therefrom in an angular rotation fashion. The use of hydraulics generally requires larger receivers which at higher frequencies result in distortion of the signal(s) to be measured. Alternately, the receiver can be divided into two subparts (a receiver unit and a hydraulic pump unit), coupled together by hydraulic hoses with both parts lowered in the borehole together. While not receivers, U.S. Pat. No. 4,569,412 to Bouyoucos, et al. and U.S. Pat. No. 4,702,343 to Paulsson disclose seismic sources which utilize hydraulic clamp mechanisms which drive one or more clamp arms perpendicular to the borehole wall.

In all known prior art receivers which used electric motor-driven clamp mechanisms, one or more clamp arms extend outward from the receiver housing in an angular rotation fashion. This results in a clamp force which is not entirely perpendicular to the borehole wall. This results in the creation of a large angular moment about the location where the clamp arm or arms connect to the tool which, in turn, causes low resonant receiver frequencies. Such angular-rotation-type clamp arm designs also inhibit high frequency receiver operation because the design itself results in clamp arm resonances. E G & G Geometrics borehole seismometer (model VLP-N785) and OYO Geospace borehole shuttle 170 are believed to be typical of this type of design.

U.S. Pat. No. 4,805,727 to Hardee et al. discloses a long and heavy down hole seismic generator in which the clamping apparatus includes a pair of oppositely disposed and transversely extendable shoe members, which are designed to center the generator in the borehole. The shoe members are connected to linkage arms which, in turn, are carried by an elongated screw drive rod. The linkage arms are set at an angle with respect to the drive rod in a scissor-jack type arrangement. The rod is coupled to the shaft of a reversible servo motor for bi-directional linear movement and locking in any desired position. In operation, rotation of the drive rod 146 in a counter-clockwise direction as shown in FIG. 15 causes the sleeve member 174 to start moving upwardly thereby forcing the lower end of the clamping shoes 166 and 168 outwardly. When the lower portion of the shoes can no longer be extended or bind up, then continued rotation of the drive rod 146 causes the drive rod itself and the upper sleeve member 184 to move downwardly thereby forcing the upper portion of the shoe members 166 and 168 to move outwardly. Rotation of the drive rod 146 is continued until the shoes are fully extended. While the shoes themselves have essentially linear movement, the scissor-jack linkage arms form an angular transmission mechanism, much like the clamp arms which extend outward in angular rotation fashion. Since the linkage arms are never perpendicular to the borehole and since the linkage arms are coupled to pins, this design results in low resonate frequencies. Further, centering the generator in the borehole has the disadvantage of creating a rocking motion of the generator about the location it is clamped to the borehole.

It is an object of the present invention to provide an advanced seismic receiver which is compact (approximately 16 inches in length), lightweight (approximately 30 lbs.), incorporates an improved electric motor driven borehole clamp design, which overcomes the limitations of the prior art, and which is capable of flat frequency response from 0 Hz to 2,000 Hz. The receiver according to the present invention:

1. has a simple electric motor driven clamp mechanism, that mechanically drives a single clamp or shoe in a linear fashion perpendicular into the borehole wall and, simultaneously, drives the receiver housing into direct contact with the opposite side of the borehole wall;

2. utilizes state of the art low noise piezoelectric accelerometers as the preferred sensing elements or, alternately, geophones;

3. is designed with finite element modeling techniques to achieve a mechanical design (clamp arm, housing, mechanical inter-connects, and accelerometry use and mounting) that yields a structure whose resonant frequencies are in excess of 2,000 Hz;

4. provides simple and reliable operation in a small lightweight package;

5. utilizes standard wireline interface if so desired;

6. incorporates multi-station interconnect capability, so that multiple receivers can be interconnected and deployed in a single well or borehole; and 7. enables the receiver to be deployed in boreholes with a wide variety of inside diameters, ranging from about 4 inches to 8 inches.

Using the electric motor-driven clamp of the present invention has several significant advantages over hydraulically-driven clamps, including:

1. use of a linear (as opposed to angular) transmission mechanism;

2. electric motors can operate in well-bores as deep as 20,000 ft., whereas hydraulic clamp means are typically limited to about 5,000 ft. depth (unless equipped with a down-hole hydraulic pump);

3. electric motors can operate up to temperatures of 200° C., whereas the use of hydraulic clamps has never been demonstrated at temperatures above 125° C.;

4. the electric motor-driven clamp can be mounted in a small lightweight package, whereas hydraulic clamp mechanisms require larger, heavier packages (or a separate hydraulic pump unit); and 5. a motor-driven clamp enables the receiver to be connected by only a standard wireline interface, whereas the hydraulic clamps require a special custom interface or a hydraulic interface.

The use of a smaller, lighter package with the motor-driven clamp of the present invention enables the receiver to couple to the borehole over a much wider range of vibrations and avoid the low resonant frequencies inherent in U.S. Pat. No. 4,805,727 to Hardee, et al., as explained below.

SUMMARY OF THE INVENTION

A borehole seismic tool, preferably a seismic receiver. The tool includes a rigid housing having a longitudinal axis, a borehole clamp received in the housing for only linear movement along a second axis which is perpendicular to the longitudinal axis of the tool, and electro-mechanical apparatus for moving the clamp. The electro-mechanical apparatus includes an electric motor positioned within the housing and apparatus coupled to both the motor and the clamp for converting rotational movement of the motor to rotational movement about the second axis. The tool also includes apparatus for converting the rotational movement about the second axis to linear movement along such axis. The apparatus for converting rotational movement from the motor to rotational movement about the second axis is, preferably, a right angle drive.

When used as a seismic receiver the housing has three parts; two of which are hermetically sealed. One or more accelerometers (or, alternately, geophones) are rigidly mounted in one of the two hermetically sealed parts; the electric motor, in the other hermetically sealed part. The clamp and the right angle drive are positioned in the third housing part, which is intermediate the two hermetically sealed parts.

Preferably, the housing has cable connectors at each end to permit a plurality of tools to be mechanically connected in series in a simple borehole. Also, preferably, a shear plate can be attached to the clamp to extend the clamping range of the tool and provide for emergency release.

DESCRIPTION OF THE PREFERRED EMBODIMENTS

Figure 1:
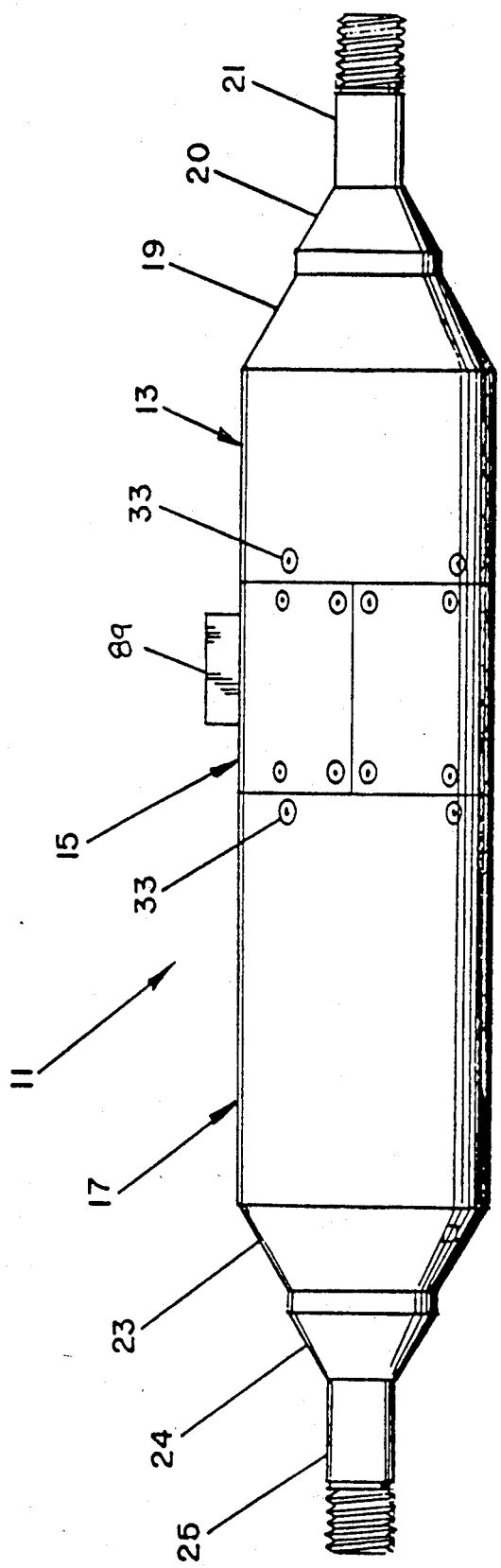
FIG. 1 is a view of the exterior of the motor-driven, clamped borehole seismic receiver of the present invention, with the clamping plunger in its extended position.

With reference to FIG. 1, borehole receiver 11 includes a first hermetically sealed cylindrical housing 13, a central section 15, and a second hermetically sealed cylindrical housing 17. Section 15 is not hermetically sealed. Attached to the tapered end 19 of housing 13 is a collar 20, to which is secured a conventional seven conductor cable connector 21, such as manufactured by Gearhart-Owens. Similarly, attached to the tapered end 23 of housing 17 is a second collar 24 and a second seven conductor cable connector 25. Such connectors are provided at opposite ends of receiver 11 so that the receiver can be wired to the surface via a standard wire-line and so that additional receivers can be mechanically connected in series in the same borehole and wired in the desired array. As those skilled in the art will appreciate, other multi-conductor (more than 7) connectors may be utilized, as is required for multi-station interconnections. Connectors 21 and 25 also function to hermetically seal tapered ends 19 and 23. Preferably, housings 13 and 17 are both of one piece construction, fabricated from type 17-4, ¼" thick stainless steel.

Figure 2:
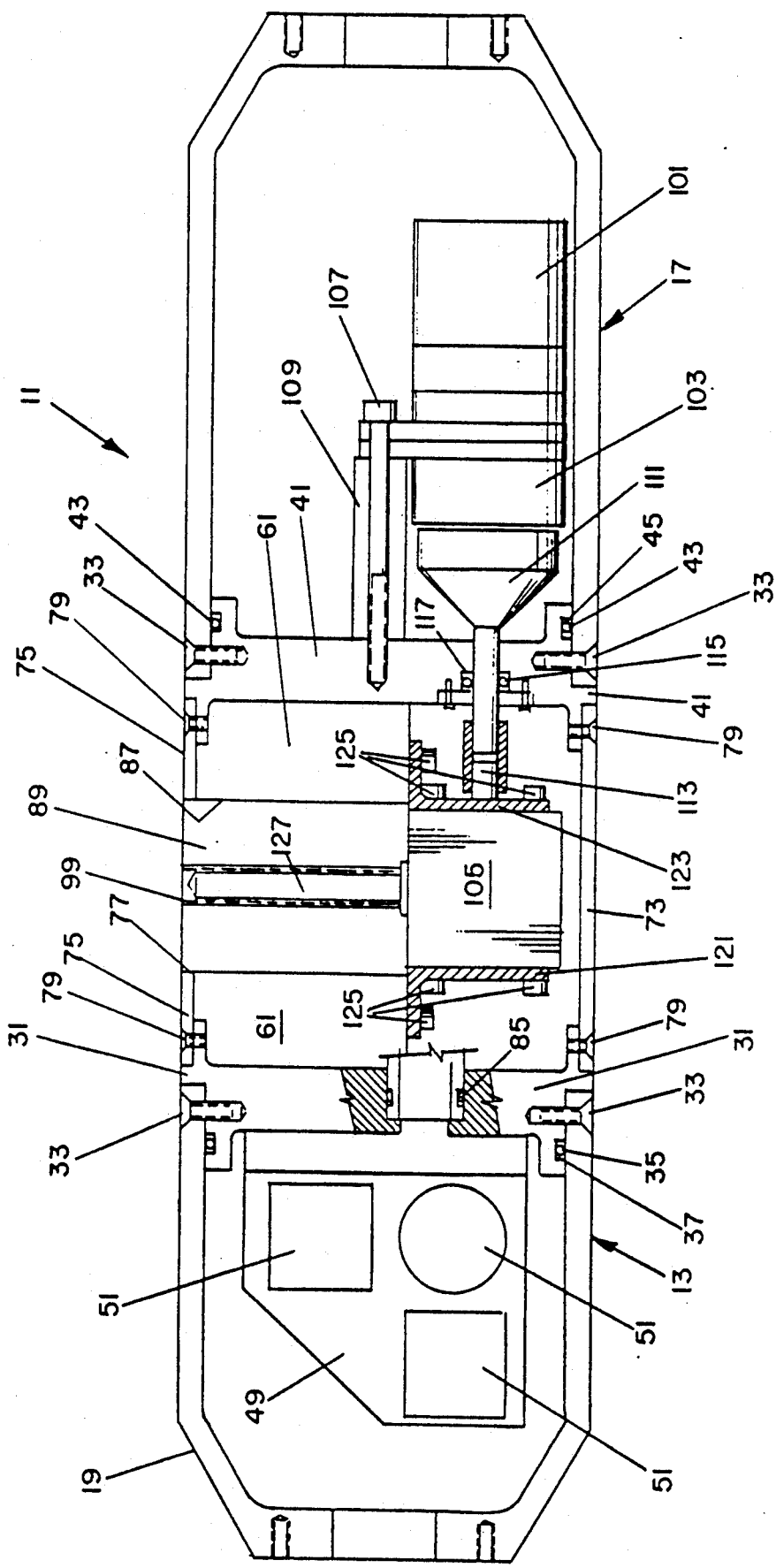
FIG. 2 is an elongated sectional view of the receiver of FIG. 1.
Figure 3:
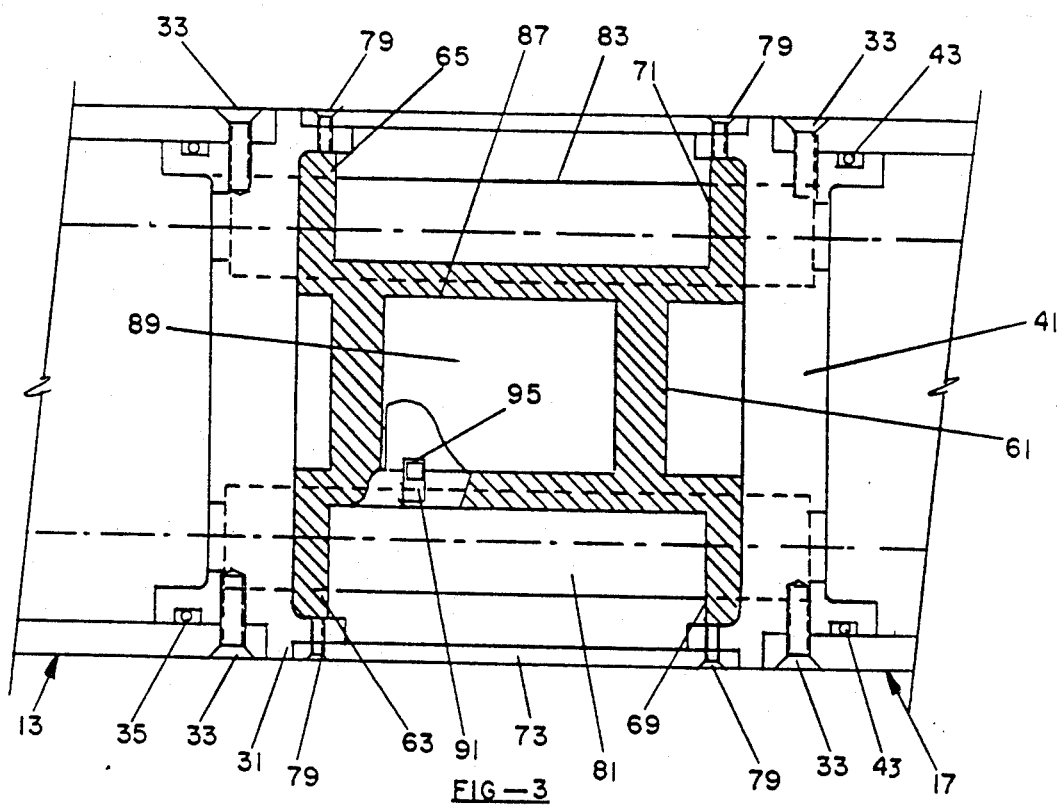
FIG. 3 is a partial elongated sectional view of the receiver of FIG. 1, taken at 90° with respect to the section of FIG. 2.

Housing 13 is connected to bulkhead 31, as illustrated in FIGS. 2 and 3, via a plurality of flat head machines screws, such as illustrated at 33. Together with close machine tolerances on the mating portions of housing 13 and bulkhead 31, high temperature and high pressure O-ring 35, which is received in groove 37, hermetically seals the cylindrical end of housing 13. Similarly, housing 17 is connected to bulkhead 41 via flat head machine screws, again such as illustrated at 33. High temperature, high pressure O-ring 43, seated within groove 45, together with close machine tolerances on the mating portions of housing 17 and bulkhead 41 provides an effective hermetic seal.

Housed within 13, via bracket 49 which is secured to bulkhead 31 via machine screws (not shown), are three signal enhancing cross-well seismic accelerometers 51 and the associated wiring harness (not shown). A three-component system is illustrated, in which the accelerometers are mounted mutually perpendicular to each other to measure both seismic compression and shear waves and to help determine the directions of such waves. Bracket 49 is rigid and accelerometers 51 are securely fastened thereto, so that the entire unit acts as one mass. As those skilled in the art will appreciate, depending on the application, the number of accelerometers used can be increased or decreased and their orientation can be varied.

We have determined that low-noise, piezo-electric accelerometers offer some significant advantages over conventional geophones. In particular, the preferred accelerometer design the model 731-200, manufactured by Wilcoxon Research, Gaithersberg, Md., modified to increase the sensitivity by a factor of 2 and increase maximum operating temperature from 85° C. to 130° C. Such accelerometers do not exhibit the "spurious resonance" problem common to geophones. Additionally, such accelerometers are insensitive to their mounting orientation and therefore do not require a gimbal mount often utilized in geophone-based sondes. Another difference, and perhaps most important, is that these low-noise piezo-electric accelerometers are more sensitive than geophones at the cross-well seismic frequencies of 150 Hz and above. This is because the electronic noise of the preferred accelerometers is lower than the electronic noise of the best geophones at frequencies above approximately 150 Hz. The accelerometers can offer as much as a 20 dB improvement in signal detection (and hence signal-to-noise ratio) at 1000 Hz. Though accelerometers such as described above are preferred, depending on the application, conventional geophones can also be utilized.

Housed within 17 is the electric motor and gear train. Additionally, housing 17 has room for electronics or other devices, such as down-hole control and command electronics when receiver 11 is used in a multi-station array.

Figure 4:
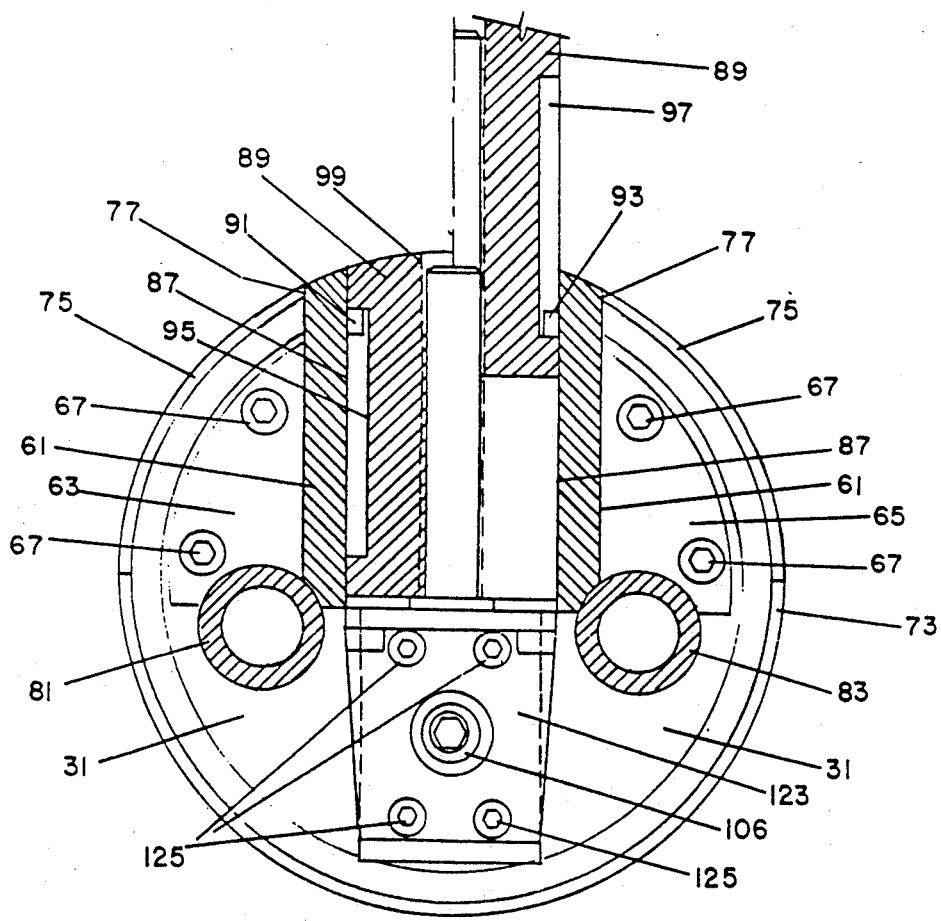
FIG. 4 is a partial sectional view of the receiver taken perpendicular to the principle axis of the receiver.

Bulkheads 31 and 41 are connected together via bracket and borehole clamp guide 61, as illustrated in FIGS. 2, 3 and 4. Bracket/guide 61 includes flanges 63, 65 which are, preferably, bolted to bulkhead 31, via socket head cap screws such as illustrated at 67. Bracket/guide 61 also includes a second pair of flanges 69 and 71 which are similarly secured to bulkhead 41 to form a rigid structure. Additional rigidity between bulkheads 31 and 41 is provided by half-cylinder cover plate 73 and half-cylinder cover plate 75, which are connected to the respective bulkheads via flat head machine screws such as illustrated at 79. Cover plate 75 has a rectangular opening 77 therein, as illustrated in FIGS. 2 and 4.

Also positioned within housing 15 are, as best illustrated in FIGS. 3 and 4, a pair of connecting tubes 81 and 83, which are hermetically sealed at their ends to bulkheads 31 and 41 via high temperature, high pressure O-rings, such as illustrated at 85. In addition to providing added rigidity, tubes 81 and 83 permit the passage of electrical wiring between housings 13 and 17.

Again as illustrated in FIGS. 2, 3 and 4, bracket/guide 61 includes a through opening 87 which, preferably, is rectangular shaped in cross-section (see FIG. 3) and is open at both ends (see FIGS. 2 and 4). As those skilled in the art will appreciate, other cross-sectional shapes can be used. Clamping shoe 89, which is made of corrosion resistant stainless steel which is case hardened, is slidably received within opening 87 for linear movement from the retracted position illustrated in FIG. 2, to the extended position illustrated in FIG. 1 and partially illustrated in FIG. 4. In order to provide for smooth action and to prevent binding, the tolerances on both opening 87 and clamp 89, as well as the gap between the opposing surfaces of opening 87 and clamp 89 must be carefully maintained. The preferred maximum gap is 0.002 inches. Four guide pins, such as illustrated at 91 and 93 are received in four mating guides, such as illustrated at 95 and 97, which limit the travel of clamp 89. Clamp 89 also includes a threaded bore 99.

Clamp 89 is driven by electric motor 101, via gear train 103 and right-angle drive 105, as best illustrated in FIG. 2. Motor 101 and gear train 103 are bolted together, as illustrated, and rigidly secured to bulkhead 41 via three bolts such as bolt 107. Each bolt 107 pass through a positioning sleeve, such as illustrated at 109. Shaft 111 is coupled to the output shaft (not shown) of gear train 103 via a spline arrangement (also not shown) and to the input shaft 113 of drive 105 via a shaft collar 106. High temperature and high pressure rotary seal 115, received in recess 117 of bulkhead 41 and held in place by cover plate 118, seals the bulkhead 41/drive shaft 111 interface. Drive 105 is secured to bracket/guide 61 via L-shaped brackets 121 and 123 and conventional socket head cap screws such as illustrated at 125. Drive 105 also includes a threaded output drive shaft 127 which is threadedly received within threaded bore 99 of clamp 89.

In operation, when borehole clamping is desired, a d.c. voltage is applied to motor 101 which results in rotation of shafts 111, 113 and 127. Rotation of shaft 127 results in linear movement of clamp 89. Clamp 89 will extend until it impacts the borehole casing, thereby forcing receiver 11 against the opposite side of such borehole. The force required to clamp receiver 11 into place is determined by the gear set used, the current absorbed by motor 101, as well as the torque rating of motor 101. Once clamped, motor 101 is turned off. To unclamp receiver 11, a voltage of the opposite polarity is applied. As a seismic receiver, the nominal clamping force is in the range of 120–200 lbs.; as a generator, the force will have to be in excess of the force generated by the generator.

Finite element analysis using Nastran code was used to demonstrate that the linearly driven clamp arm, as described above, offers significantly improved seismic coupling to the borehole over the angular-rotation (lever-type) clamp arms of the prior art. This is due to several factors: (1) the percent of clamp surface area in orthogonal contact with the borehole is greatly increased; (2) the orthogonal component of the clamping forces on the borehole is greatly increased; (3) a large portion of the surface of the receiver housing (on the side opposite to the clamp) is in direct contact with the borehole wall which, in conjunction with factors (1) and (2), greatly increases the seismic coupling between the receiver and the borehole; (4) clamp arm resonances due to the pinned nature of the angular-rotation clamp arms are eliminated; (5) the center section of receiver 11 is stiff, vis-a-vis the overall construction; and (6) decreased tool size. Though the apparatus disclosed by Hardee et al. is a generator, not a receiver, the linear driven clamp arm of the present invention has significantly improved coupling over Hardee's scissor-jack arrangement for the same reasons. The scissor-jack arrangement of Hardee et al. does not exert a force which is entirely perpendicular to the borehole.

Figure 5:
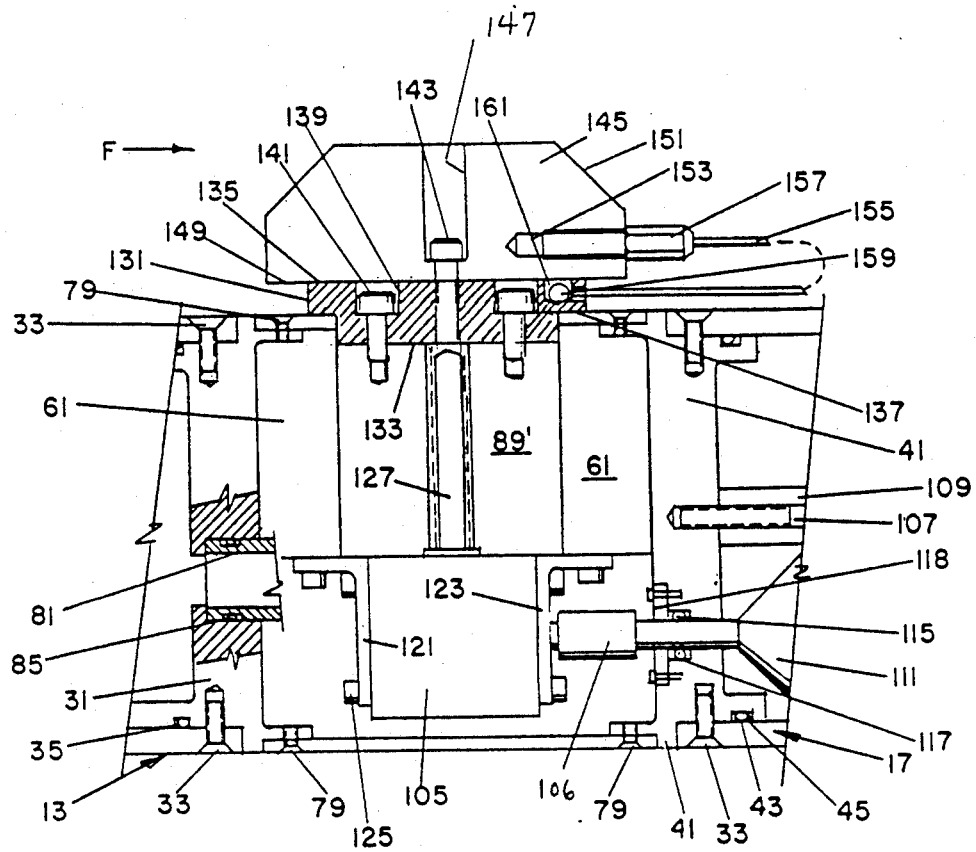
FIG. 5 is a partial sectional view illustrating the attachment of an adaptor to the clamping shoe.

In order to permit the use of receiver 11 in a wide variety of borehole diameters, typically from just over 4″ to 8″, adaptors of various sizes may be added to clamp 89. Alternatively, a half-shell may be rigidly secured to receiver 11 opposite opening 77 in cover plate 75. With reference to FIG. 5, the preferred form of adaptor is illustrated. Secured to clamp 89′, which is shorter than clamp 89 of FIGS. 2-4, is an attachment plate 131. In cross section plate 131 has a stepped configuration, having a lower portion 133 which is received within rectangular opening 77 of cylindrical cover plate 75. When viewed from the end plate 131 has an arcuate configuration, with outer surface 135 lying in an imaginary cylindrical surface, concentric with the cylindrical surface defined by plates 73, 75 and housings 13 and 17. In the retracted position, FIG. 5, arcuate surfaces 137 are in contact with the outer surface of cover plate 75. Plate 131 also includes a pair of stepped openings 139, in which are received socket head cap screws 141 to rigidly secure plate 131 to clamp 89'.

Attached to plate 131, via a pair of aluminum socket head cap screws such as illustrated at 143, is shoe or clamp adaptor 145. Shoe 145 includes: a pair of shouldered openings which lie in a plane perpendicular to the plane of openings 139, one of which is illustrated at 147, in which are received screws 143; an arcuate surface 149, which conforms with surface 135; tapered ends 151; and threaded opening 153. Clamp adapter 145 is also connected to plate 131 via a 1/16 inch diameter aircraft cable 155. Threaded plug fitting 157 is secured into threaded opening 153. Ball 159, secured to the other end of cable 155, is received within recess 161, as illustrated in FIG. 5.

In operation, in the event clamp 89' fails to retract or fails to fully retract, aluminum screws 143 will shear when force F is applied, as when receiver 11 is moved in an upward direction relative to the borehole. As those skilled in the art will appreciate, a material that has a shear strength less than that of stainless steel should be used. With screws 143 sheared, shoe adaptor 145 will fall into the borehole to a position below receiver 11. Cable 155 prevents shoe adaptor 145 from falling to the bottom of the borehole.

Figure 6:
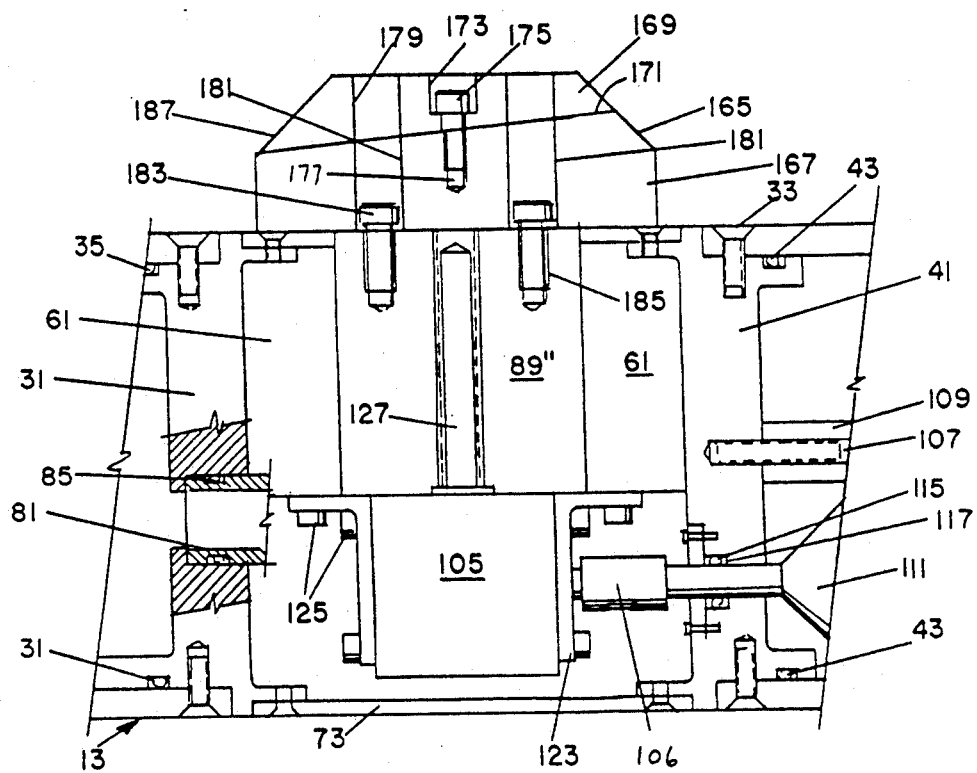
FIG. 6 is a partial section view illustrating an alternate adaptor attached to the clamping shoe.

With reference to FIG. 6, alternate clamp adaptor 165 is illustrated. Adaptor 165 includes an inner portion 167 and an outer or shear portion 169, which mates with inner portion 167 along shear line 171. Shear portion 169 includes a pair of shouldered through holes, one of which is illustrated at 173. Aluminum socket head cap screws, such as illustrated at 175, are received in holes 173 and mating threaded openings 177 in inner portion 167. Shear portion 169 is also provided with a pair of through holes 179 which, in the assembled adaptor, align with shouldered openings 181 provided in bottom portion 167. Socket head cap screws 183 are received in openings 181 and engage threaded openings 185 in clamp 89''. Finally, clamp adaptor 165 includes a pair of inclined surfaces 187.

In operation, adaptor 165 functions much like adaptor 145, with screws 175 shearing when a sufficient force, parallel to the longitudinal axis of receiver 11, is applied to surface 187. Shear portion 165 then falls away, permitting easy removal of receiver 11 from the borehole.

Figure 7:
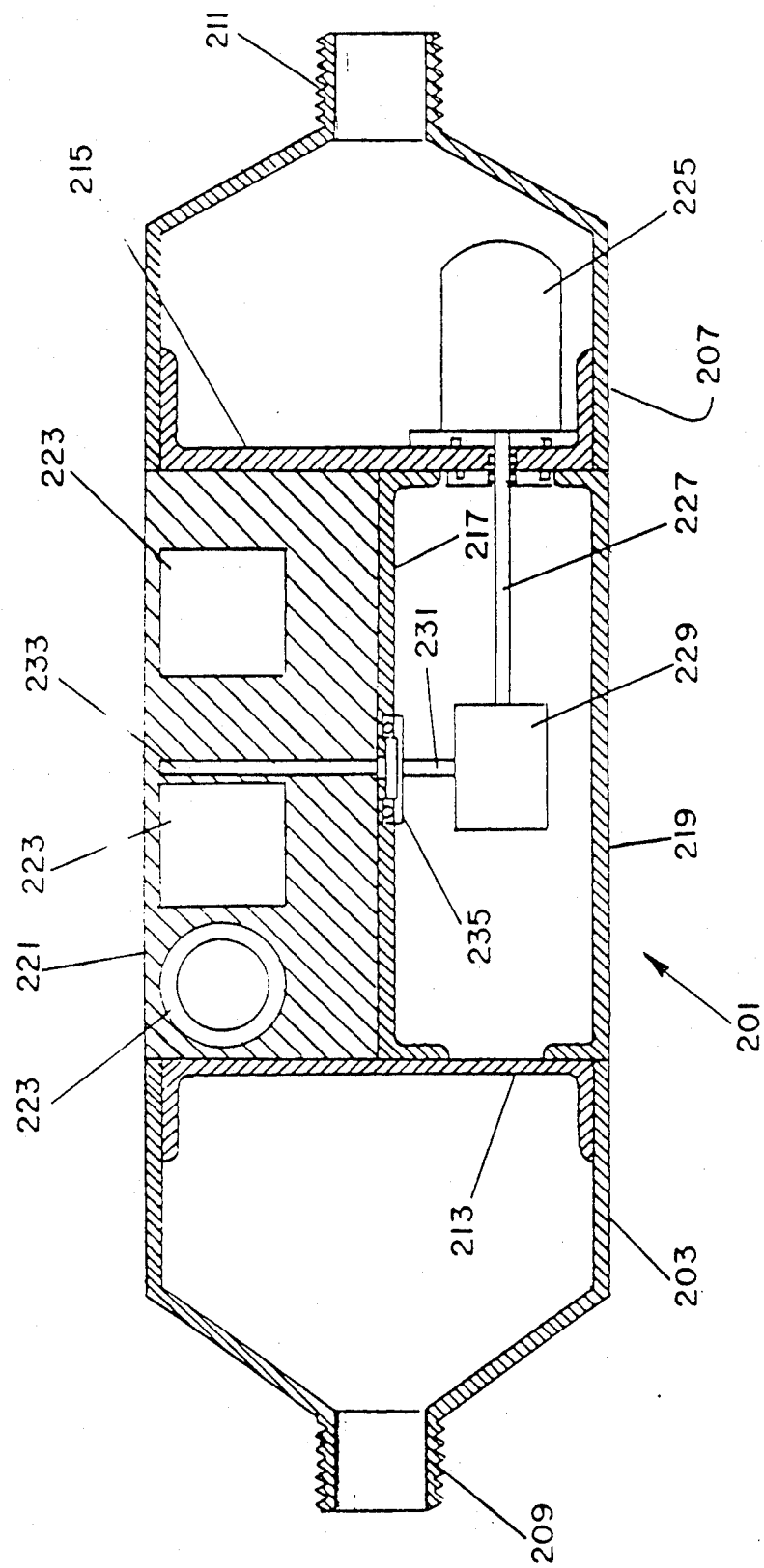
FIG. 7 is a sectional schematic of an alternate embodiment.

FIG. 7 shows, in schematic form, an alternate embodiment of the invention, wherein the accelerometers are housed in the clamping block itself. Receiver 201 includes a first hermetically sealed housing 203, a center section 205 and a second hermetically sealed housing 207. Housings are sealed at their tapered ends by cable connectors 209 and 211 and sealed at their respective cylindrical ends by bulkheads 213 and 215. Bulkheads 213 and 215 are connected by bracket 217 and cylindrical shaped shell 219. Within clamping plunger 221 three accelerometers 223 are sealed. As with the first embodiment, the number and orientation of the accelerometers can be varied to meet the needs of the particular application. Linear motion of plunger 221 is, like the first embodiment, accomplished via motor and gear train 225, drive shaft 227, right angle drive 229 and threaded drive shaft 231. Shaft 231 is, in turn, received in threaded bore 233 provided in plunger 221. Thrust bearing 235 is also included. In operation, receiver 201 operates the same as the first embodiment. Because of the improved coupling between the borehole and accelerometers 223, flat frequency response is further increased.

Whereas the drawings and accompanying description have shown and described the preferred embodiments of the present invention, it should be apparent to those skilled in the art that various changes may be made in the form of the invention without affecting the scope thereof.

We claim:

1. A borehole seismic tool comprising:
 a housing having a longitudinal axis, an exterior surface, and means adapted to engage the wall of a borehole;
 a borehole clamp, said clamp being received in said housing for nonrotating linear movement along a second axis which is perpendicular to said longitudinal axis, said clamp having a surface adapted to engage said borehole wall; electro-mechanical means for moving said clamp, said means including an electric motor positioned within said housing, said motor having a rotational output shaft;
 first means coupled to said motor output shaft for converting said rotational output to rotational movement of a drive shaft about said second axis; and
 thread means on said drive shaft threaded into a bore extending into said clamp from a side opposite said wall engaging surface for converting said rotational movement of said drive shaft to linear movement of said clamp;
 whereby, when said thread means causes said clamp surface to engage said borehole wall, said means adapted to engage is driven into engagement with said borehole wall.

2. The apparatus as set forth in claim 1, wherein said first means is a right angle drive means.

3. The apparatus as set forth in claim 1, wherein said means adapted to engage the wall of said borehole is a portion of said exterior surface opposite said clamp.

4. The apparatus as set forth in claim 1, wherein said housing includes at least one pressure sealed portion interconnected to a second portion, said clamp being received in said second portion.

5. The apparatus as set forth in claim 4, further including means for sensing vibration and wherein said means for vibration sensing are mounted in said pressure sealed portion.

6. The apparatus as set forth in claim 4, wherein said thread means is mounted in said second portion.

7. The apparatus as set forth in claim 6, wherein said electric motor is received in said at least one pressure sealed portion and wherein said first means is a right angle drive means, said drive means being mounted in said second portion.

8. The apparatus as set forth in claim 7, wherein said housing further includes a second pressure sealed portion and further including means for sensing vibrations, said means for sensing vibrations being rigidly secured in said second pressure sealed portion.

9. The apparatus as set forth in claim 1, further including means for sensing vibrations.

10. The apparatus as set forth in claim 9, wherein said means for sensing vibrations are mounted in a hermetically sealed portion of said housing.

11. The apparatus as set forth in claim 9, wherein said means for sensing vibrations are mounted in said clamp.

12. The apparatus as set froth in claim 1, further including a plate, said plate being attached to said clamp to extend the clamping range of said tool.

13. The apparatus as set forth in claim 12, wherein said plate is attached to said clamp by means which will permit said plate to shear from said clamp when subjected to a predetermined shearing force.

14. The apparatus as set forth in claim 13, wherein said plate is also flexibly attached to said tool to provide easy recovery of the sheared portion of the tool.

* * * * *